(12) United States Patent
Tseng et al.

(10) Patent No.: US 11,451,029 B2
(45) Date of Patent: Sep. 20, 2022

(54) ELECTRONIC SYSTEM, OUTLET STRUCTURE AND CABLE

(71) Applicant: ABILITY ENTERPRISE CO., LTD., New Taipei (TW)

(72) Inventors: Cheng-Kuang Tseng, New Taipei (TW); Yu-Cheng Huang, New Taipei (TW)

(73) Assignee: ABILITY ENTERPRISES CO., LTD., New Taipei (TW)

( * ) Notice: Subject to any disclaimer, the term of this patent is extended or adjusted under 35 U.S.C. 154(b) by 571 days.

(21) Appl. No.: 16/512,959

(22) Filed: Jul. 16, 2019

(65) Prior Publication Data
US 2020/0028341 A1    Jan. 23, 2020

(30) Foreign Application Priority Data

Jul. 23, 2018    (CN) .......................... 201821165671.3

(51) Int. Cl.

| | | |
|---|---|---|
| *H02G 3/08* | (2006.01) | |
| *H02G 3/22* | (2006.01) | |
| *H01R 13/52* | (2006.01) | |
| *H01R 13/502* | (2006.01) | |

(52) U.S. Cl.
CPC ........... *H02G 3/083* (2013.01); *H01R 13/502* (2013.01); *H01R 13/52* (2013.01); *H02G 3/22* (2013.01)

(58) Field of Classification Search
CPC .......... H02G 3/08; H02G 3/081; H02G 3/083; H02G 3/22; H02G 3/24; H02G 15/00; H02G 15/013; H02G 15/04; H02G 15/06; H02G 15/23; H01R 13/502; H01R 13/52; H01R 13/5202; H01R 13/5205; H01R 13/521; H01R 13/5221
USPC .............. 174/50, 68.1, 68.3, 500, 72 A, 135, 174/152 G, 153 G, 152 R, 539, 564, 59, 174/61, 77 R, 137 R, 138 R; 16/2.1, 2.2; 277/312, 314, 322, 360
See application file for complete search history.

(56) References Cited

U.S. PATENT DOCUMENTS

| | | | | |
|---|---|---|---|---|
| 4,379,204 A | * | 4/1983 | Perrault .................. | H02G 3/22 174/653 |
| 5,866,853 A | * | 2/1999 | Sheehan .............. | H02G 3/0675 174/653 |
| 5,920,035 A | * | 7/1999 | Haney .................... | B01D 65/02 174/152 G |
| 6,743,980 B2 | * | 6/2004 | Milanowski ......... | G02B 6/4444 174/665 |

(Continued)

*Primary Examiner* — Angel R Estrada
(74) *Attorney, Agent, or Firm* — McClure, Qualey & Rodack, LLP

(57) ABSTRACT

An electronic system, an outlet structure and a cable are provided. The outlet structure includes a housing, a cable and a positioning member. The housing has a through hole and a receiving slot. The receiving slot is disposed on a second side of the housing. The through hole extends to a first side of the housing from the receiving slot. The cable includes a wire and an annulus annularly disposed on the wire, and has a groove set on one side of the annulus against the wire which passes though the through hole. The annulus is disposed in the receiving slot of the housing and on the through hole. The positioning member engages in the groove and is fixed on the second side of the housing. The outlet structure not only reduces overall material cost, but also simplifies overall assembly difficulty.

19 Claims, 9 Drawing Sheets

(56) References Cited

U.S. PATENT DOCUMENTS

| | | | | |
|---|---|---|---|---|
| 7,355,130 B2* | 4/2008 | Holman | ............. | H02G 3/088 |
| | | | | 174/152 G |
| 8,502,090 B2* | 8/2013 | Winship | ............. | H02G 3/22 |
| | | | | 174/72 A |
| 8,604,362 B2* | 12/2013 | Hsu | ............. | H05K 5/069 |
| | | | | 16/2.2 |
| 8,853,537 B2* | 10/2014 | Kempeneers | ............. | F16J 15/02 |
| | | | | 174/77 R |

\* cited by examiner

ELECTRONIC SYSTEM, OUTLET STRUCTURE AND CABLE

This application claims the benefit of People's Republic of China Application No. 201821165671.3, filed Jul. 23, 2018, the disclosure of which is incorporated by reference herein in its entirety.

TECHNICAL FIELD

The invention relates in general to an electronic system, an outlet structure and a cable, and more particularly to a cable with an annulus, an electronic system whose annulus is disposed on the through hole, and an outlet structure.

BACKGROUND

To void water entering the electronic device (such as the surveillance camera), most of current electronic devices are equipped with a water-proof function to reduce the likelihood of being penetrated by water.

For example, when the cable of a conventional electronic device is over-extended, water may easily penetrate the electronic device. If so, the control circuit inside the electronic device may malfunction, and maintenance cost will increase. The current solution to the above problems is tightly coupling the tight-fitting member with special specifications to the cable by a specific tightening force to stop water penetrating to the electronic device along the cable.

However, to stop water penetrating to the electronic device along the cable, the tight-fitting member with special specifications is an extra cost and the tightening force needs to be specific, not only increasing overall material cost but also increasing the difficulty for assembling the electronic device and the cable.

SUMMARY

According to one embodiment of the present invention, an electronic system includes a housing, an electronic device, a cable and a connecting member. The housing has a through hole and a coupling portion. The electronic device is disposed on the housing through the coupling portion. The cable includes a wire and an annulus. The annulus is disposed on the wire. The wire passes though the through hole. The annulus is disposed on the through hole. The cable is electrically coupled to the electronic device through the wire. The annulus is disposed on the housing through the connecting member. Thus, the structure of the above implementation not only reduces overall material cost, but also simplifies the difficulty for assembling the cable and the housing.

According to one or more than one embodiment of the present invention, the housing further has a first side and a second side disposed oppositely. The second side has a receiving slot recessed towards the first side. The through hole extends to the first side from the receiving slot. The annulus is disposed in the receiving slot and fixed on the second side through the connecting member.

According to one or more than one embodiment of the present invention, the annulus has a groove. The groove is set on one side of the annulus against the wire and surrounds the wire. The connector has a notch. The notch has a side edge engaging in the groove, and the connector is movably fixed on the second side of the housing.

According to one or more than one embodiment of the present invention, the electronic system further includes at least one flexible pad. The receiving slot has a bottom and an inner surface connected to the bottom. The housing further includes a protrusion projecting from the bottom of the receiving slot. The protrusion surrounds the through hole, and a trench surrounding the protrusion is set between the protrusion and the inner surface of the receiving slot. The flexible pad is disposed in the trench and surrounds the protrusion. The annulus contacts the protrusion and the flexible pad.

According to one or more than one embodiment of the present invention, the housing further includes at least two limiting bumps disposed on the second side of the housing. A limiting groove is set between these limiting bumps. The connector is disposed in the limiting groove.

According to one or more than one embodiment of the present invention, the housing has a first side, a second side and a recess. The first side and the second side are disposed oppositely. The recess is formed on the first side of the housing. The through hole penetrates the first side to the second side from the recess. The recess and the through hole are co-axial. The annulus has a groove. The annulus is movably disposed in the recess and selectively disposed on the through hole. The connector is disposed in the groove of the annulus and interposed between the annulus and a lateral surface of the recess.

According to one or more than one embodiment of the present invention, the cable further includes a stopper. The stopper is disposed on the wire and surrounds the wire. The stopper is connected to the annulus. When the annulus is disposed on the through hole, the stopper is tightly disposed in the through hole.

According to one embodiment of the present invention, an outlet structure includes a housing, a cable and a positioning member. The housing has a through hole and a receiving slot. The receiving slot is disposed on the second side of the housing. The through hole extends to the first side of the housing from the receiving slot. The cable includes a wire and an annulus. The annulus is disposed on the wire and has a groove set on one side of the annulus against the wire. The wire passes though the through hole. The annulus is disposed in the receiving slot of the housing and on the through hole. The positioning member engages in the groove and fixed on the second side of the housing.

According to one embodiment of the present invention, an outlet structure includes a housing, a cable and at least one flexible pad. The housing has a through hole and a recess. The through hole extends to one side of the housing opposite to the recess from the recess. The cable includes a wire and an annulus. The annulus is disposed on the wire. The annulus has at least one groove which is set on one side of the annulus against the wire and surrounds the wire. The wire passes though the through hole. The annulus is movably disposed in the recess and selectively disposed on the through hole. The flexible pad is disposed in the groove and interposed between the annulus and the inner surface of the recess.

According to one embodiment of the present invention, a cable of an electronic system includes at least one wire and annulus. The wire has at least one wire and an insulation layer. The insulation layer encloses the wire. The annulus is disposed on the insulation layer and surrounds the insulation layer. The annulus has at least one groove which is set on one side of the annulus against the insulation layer and surrounds the annulus.

The above disclosure relates to the problems to be resolved, the solutions and expected effects of the solutions. Details of the present invention are disclosed below with accompanying drawings.

The above and other aspects of the invention will become better understood with regard to the following detailed description of the preferred but non-limiting embodiment (s). The following description is made with reference to the accompanying drawings.

DETAILED DESCRIPTION

A number of embodiments of the present invention are disclosed below with accompanying drawings. For the descriptions to be better understood, many details in practical application are disclosed below. However, a person ordinary skilled in the technology field will understand that in some embodiments of the present invention, these details in practical application are not necessary, and shall not be used to limit the scope of protection of the present invention. Furthermore, to simplify the accompanying drawings, some structures and elements are schematically illustrated in the accompanying drawings. Moreover, the dimension scales used in the accompanying drawings are not based on actual proportion of the product.

Figure 1:
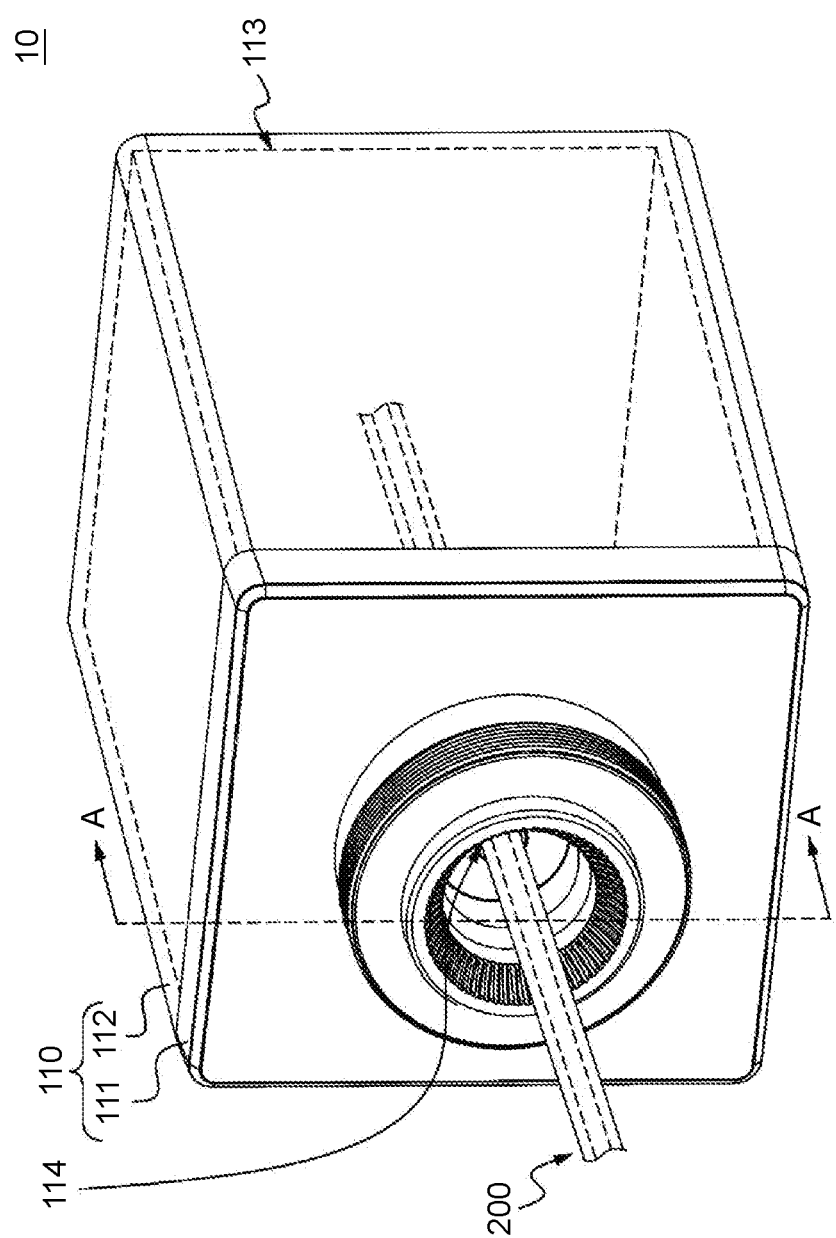
FIG. 1 is a 3D schematic diagram of an outlet structure according to an embodiment of the present invention.
Figure 2:
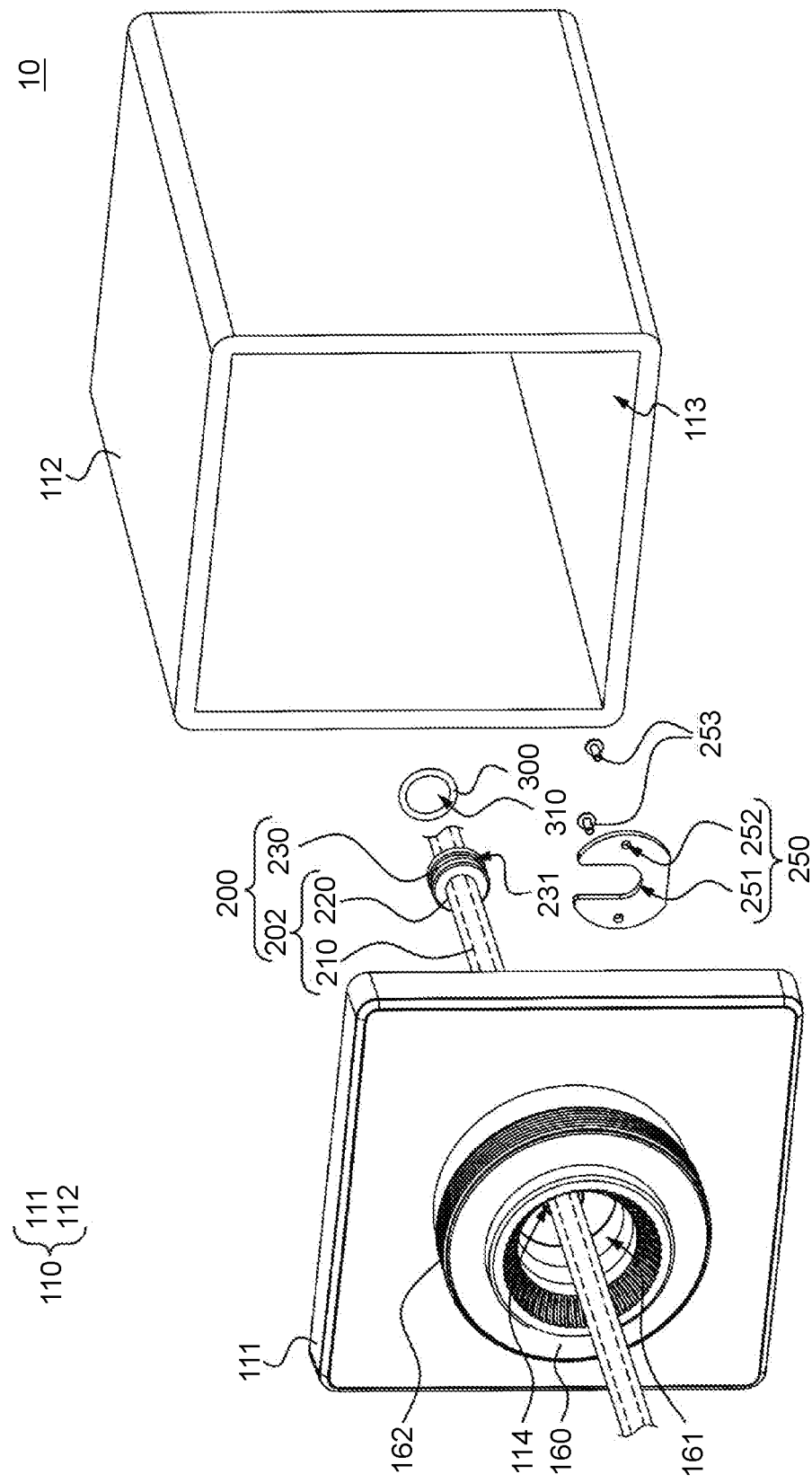
FIG. 2 is an explosion diagram of FIG. 1.
Figure 3:
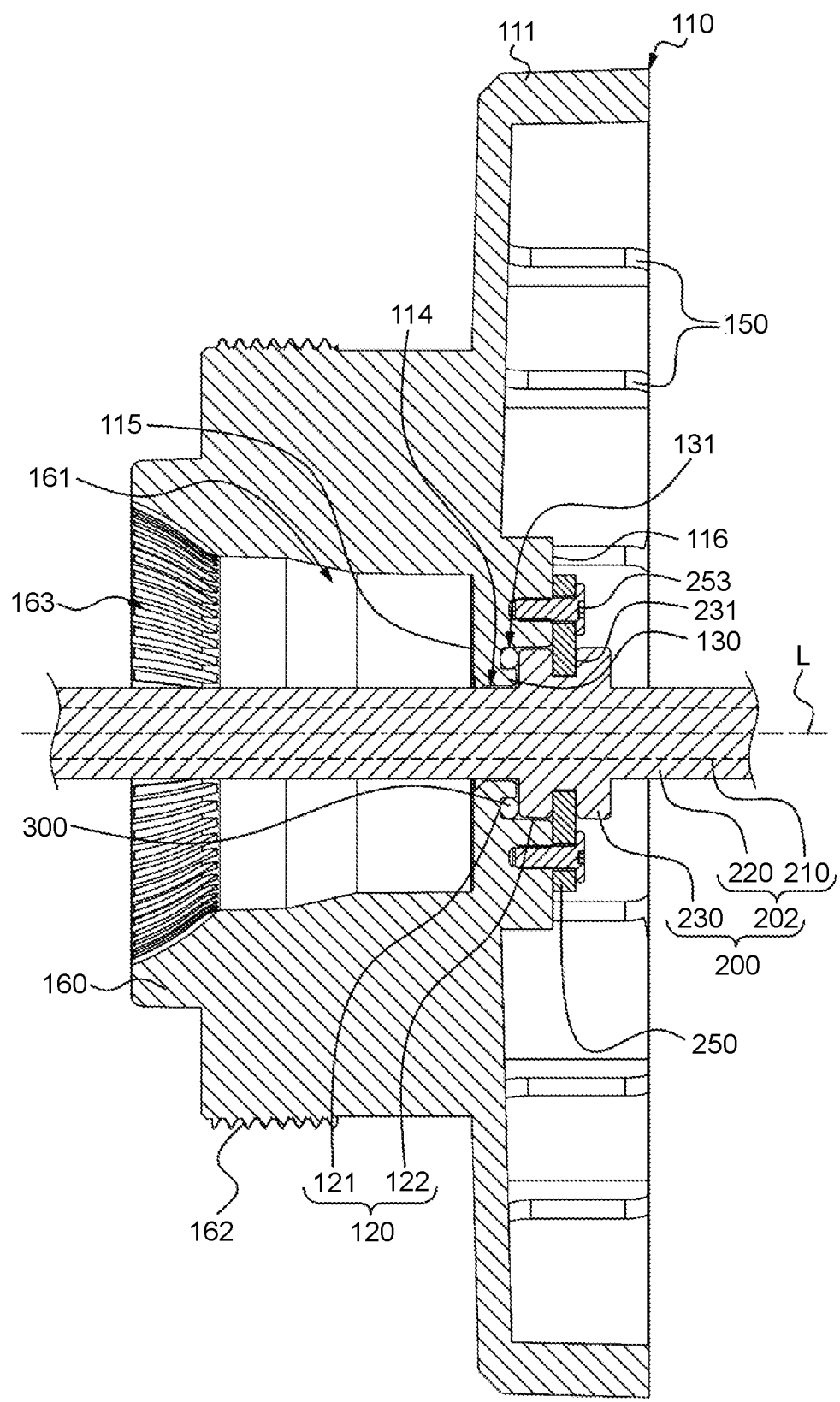
FIG. 3 a partial cross-sectional view of the outlet structure of FIG. 1 along a cross-sectional line A-A.

FIG. 1 is a 3D schematic diagram of an outlet structure 10 according to an embodiment of the present invention. FIG. 2 is an explosion diagram of FIG. 1. FIG. 3 is a partial cross-sectional view of the outlet structure 10 of FIG. 1 along a cross-sectional line A-A. As indicated in FIG. 1 to FIG. 3, the outlet structure 10 includes a housing 110, a cable 200 and a connector 250.

The housing 110 has a through hole 114, a first side 115 and a second side 116 opposite to the first side 115. The through hole 114 is disposed on the first side 115, and at least penetrates the first side 115.

The cable 200 passes though the through hole 114, and is exposed from the first side 115 and the second side 116. To be more specifically, the cable 200 includes a wire 202 and an annulus 230. The wire 202 includes at least one wire 210 and an insulation layer 220. The insulation layer 220 encloses the wire 210. The annulus 230 is disposed on the wire 202 and surrounds the wire 202. To be more specifically, the annulus 230 is connected to a part of the insulation layer 220 and surrounds the surface of the insulation layer 220 opposite to the wire 210. The wire 202 passes though the through hole 114. The annulus 230 is disposed on the through hole 114 and shields the through hole 114. In an embodiment, the annulus 230 and the insulation layer 220 are integrally formed in one piece. The annulus 230 of the cable 200 is disposed on the housing 110 through the connector 250.

In an embodiment, the housing 110 further has a receiving slot 120 disposed on the second side 116 of the housing 110. The through hole 114 extends to the first side 115 from the receiving slot 120. The annulus 230 is disposed in the receiving slot 120. Detailed descriptions of the receiving slot 120 are disclosed below.

The outlet structure 10 further includes a flexible pad 300 which surrounds the cable 200 and is interposed between the cable 200 and the housing 110. With the use of the flexible pad 300, water or dust can hardly enter the housing 110 through the through hole 114.

In the present embodiment, the cable 200 is fixed on the housing 110. For example, the annulus 230 of the cable 200 is disposed on the through hole 114 and fixed on the second side 116 of the housing 110 through the connector 250. As indicated in FIG. 3, the diameter of the annulus 230 is greater than the opening of the through hole 114. With the annulus 230 being fixed on the housing 110, the cable 200 will not move freely and water or dust will not enter the housing 110. In an embodiment where the flexible pad 300 is included, the flexible pad 300 is tightly interposed between the annulus 230 and the housing 110.

In the present embodiment as indicated in FIG. 2 and FIG. 3, the cable 200 has at least one groove 231 set on one side of the annulus 230 against the insulation layer 220. The connector 250 engages in the groove 231. The annulus 230 of the cable 200 and the housing 110 are engaged through the connector 250. The connector 250 may be realized by such as a positioning member. The connector 250 and the cable 200 are engaged through the groove 231. To be more specifically, one part of the connector 250 engages in the groove 231, and the other part of the connector 250 is fixed on the second side 116 of the housing 110. The connector 250 tightly presses the flexible pad 300 and the annulus 230 towards the through hole 114 to increase the water-proof or dust-proof performance of the outlet structure 10 or even water-tightly seal the through hole 114 through the annulus 230 and the flexible pad 300. In the present embodiment, the connector 250 may be realized by such as a positioning member and may be formed of a hard material such as metal or plastics, but the present invention is not limited thereto.

In an illustrative rather than a restrictive sense, the groove 231 is an annular groove annularly disposed on the annulus 230. As indicated in FIG. 2, in an embodiment where the connector 250 is a positioning member, the connector 250 is a C-shaped sheet, and has a notch 251 and two screw holes 252. The notch 251 is interposed between the two screw holes 252. The shape of the notch 251 may match with that of the cable or the groove 231. For example, the notch 251 has two opposite parts and a part connecting the two opposite parts. The shape of the part connecting the two opposite parts may be an arc or a straight line, but the present invention is not limited thereto. When the connector 250 engages in the groove 231, the side edge of the notch 251 engages in the groove 231. For example, the annulus 230 holds the connector 250, and the connector 250 is limited in the groove 231 of the annulus 230. On the other hand, with the screws 253 engaging with the screw holes 252, the connector 250 is movably fixed on the second side 116. That is, the annulus 230 is limited on the second side 116 by the connector 250. Thus, the annulus 230 may provide a pressure towards the through hole 114 and may also provide a force for pressing the flexible pad 300. However, the present invention is not limited thereto, and other fixing methods are also within the scope of protection of the present invention.

Figure 4:
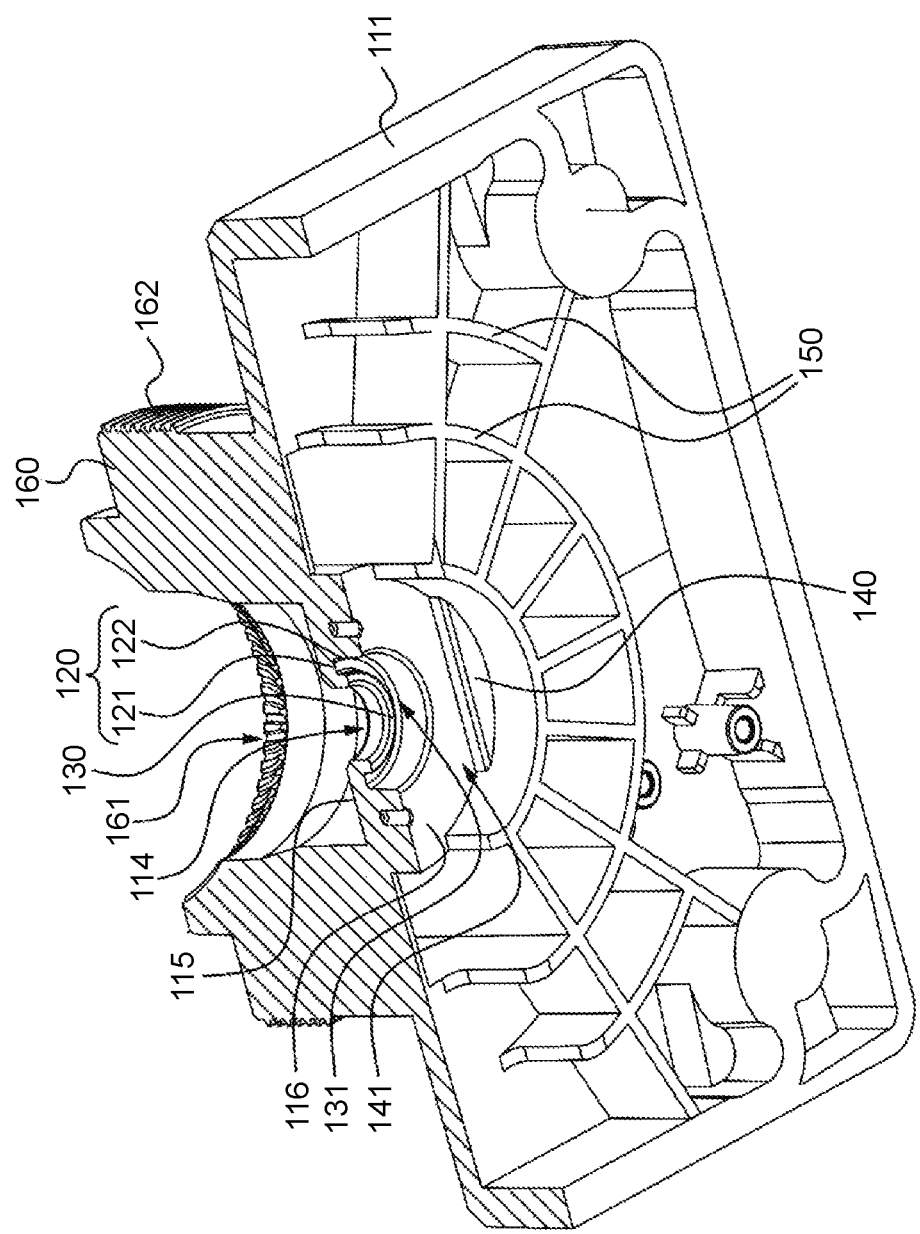
FIG. 4 is a cross-sectional diagram of the housing of FIG. 2.

FIG. 4 is a cross-sectional diagram of the housing 110 of FIG. 2. As indicated in FIG. 3 and FIG. 4, the housing 110 further includes a receiving slot 120 disposed on the second side 116 of the housing 110. For example, the receiving slot 120 is formed by recessing the second side 116 towards the first side 115, and the through hole 114 penetrates the receiving slot 120 to reach the first side 115. For example, the through hole 114 penetrates the first side 115 and the bottom 121 of the receiving slot 120. That is, the through hole 114 and the receiving slot 120 are interconnected. The annulus 230 is disposed in the receiving slot 120. In the present embodiment, the annulus 230 projects from the second side 116, and one side of the groove 231 flushes with the second side 116. When the connector 250 engages in the groove 231, the connector 250 directly presses the inner side of the groove 231 flushing with the second side 116. In other embodiments, the annulus 230 may be completely received in the receiving slot 120, one surface of the annulus 230 flushes with the second side 116, and the connector 250 directly presses the surface of the connector 250 flushing with the second side 116. The receiving slot 120 includes a bottom 121 and at least one inner surface 122. The inner surface 122 surrounds and connects the bottom 121. The housing 110 further includes a protrusion 130 projecting from the bottom 121 of the receiving slot 120. That is, the protrusion 130 projects from the bottom 121 of the receiving slot 120, the protrusion 130 surrounds the through hole 114, and a trench 131 surrounding the protrusion 130 is set between the protrusion 130 and the inner surface 122.

In the present embodiment, the flexible pad 300 is an annular pad and has an opening 310. The flexible pad 300 is disposed in the trench 131 and mounted on the protrusion 130. That is, the protrusion 130 passes through the opening 310 the flexible pad 300 and surrounds the protrusion 130. The flexible pad 300 is interposed between the bottom 121 of the receiving slot 120 and the annulus 230. In other words, the annulus 230 is disposed in the receiving slot 120 and contacts with the protrusion 130 and the flexible pad 300. When the annulus 230 is disposed in the receiving slot 120 and the connector 250 limits the annulus 230 on the second side 116, the annulus 230 presses the protrusion 130 and the flexible pad 300. In an illustrative rather than a restrictive sense, the protrusion 130 has the shape of a round tube, and the flexible pad 300 and the trench 131 both have the shape of a ring.

Figure 5:
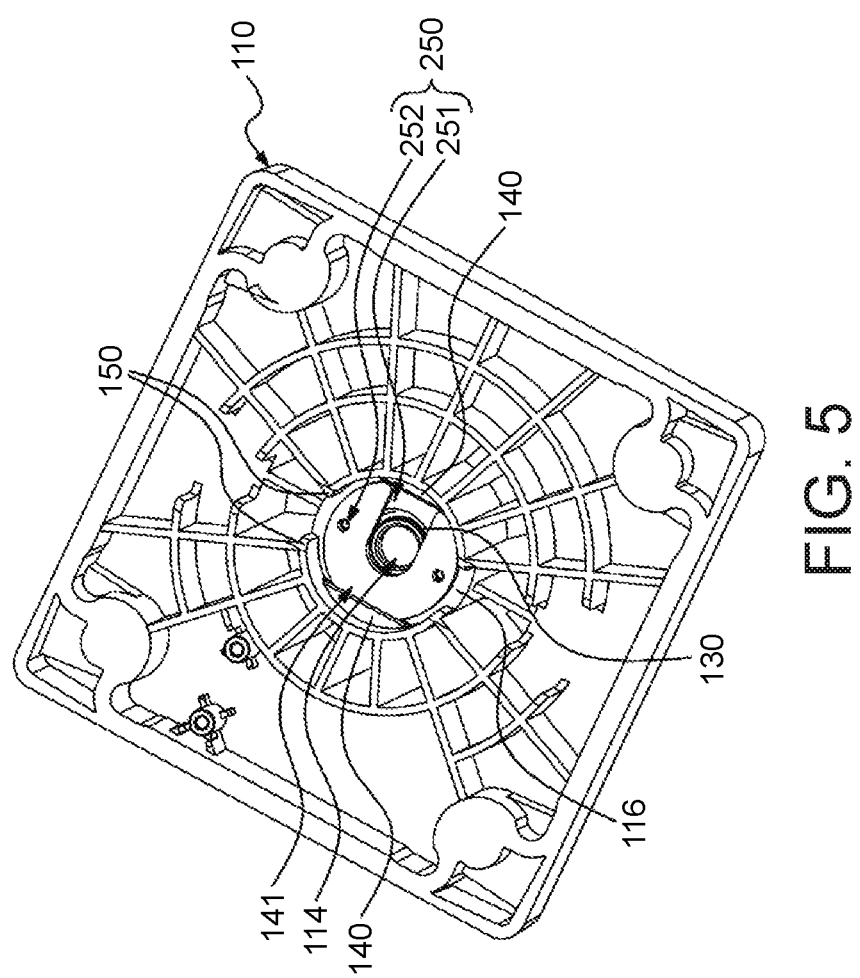
FIG. 5 is an assembly diagram of the housing and the connector of FIG. 4.

FIG. 5 is an assembly diagram of the housing and the connector 250 of FIG. 4. In an embodiment as indicated in FIG. 4 and FIG. 5, the housing 110 further includes at least two limiting bumps 140 disposed on the second side 116. A limiting groove 141 is set between the two limiting bumps 140. The limiting groove 141 and the receiving slot 120 are interconnected. Thus, when the connector 250 is fixed on the second side 116, the connector 250 is exactly embedded in the limiting groove 141, and two opposite ends of the connector 250 respectively contact with the two limiting bumps 140, such that the connector 250 may be firmly disposed in the limiting groove 141, and the cable 200 is less likely to move freely in the through hole 114.

As indicated in FIG. 4 and FIG. 5, the housing 110 further includes multiple reinforced rib structures 150. In the present embodiment, the reinforced rib structures 150 are distributed on the second side 116 of the housing 110 at intervals and connected to the two limiting bumps 140 respectively. The reinforced rib structures 150 may reinforce the structural strength of the housing 110.

As indicated in FIG. 2 and FIG. 3, the housing 110 further includes a recess 161 formed on the first side 115 of the housing 110. The recess 161 and the through hole 114 are co-axial (referring to the axial line L of FIG. 3) and interconnected. The recess 161 exposes the first side 115. The cable 200 passes though the through hole 114 and the recess 161. In an embodiment, the housing 110 further includes an accommodation space 113 and a linker160, and the linker160 has a notch 163. At least one electronic element (such as a control circuit, not illustrated) may be disposed in the accommodation space 113. The linker160 is disposed on one side of the housing 110 against the accommodation space 113 (such as the first side 115). In an embodiment, the housing 110 and the linker160 are integrally formed in one piece. The linker160 may be a hollowed structure and the recess 161 may be formed in the linker160. An electronic device 410 may be disposed on the housing 110 through the linker160. For example, the housing 110 further includes an external screw portion 162 formed on an external surface of the linker160. The housing 110 and the electronic device 410 may be assembled through the external screw portion 162. The cable 200 further passes through the notch 163 to be electrically couple to the electronic device 410 to form an electronic system 400. The electronic device 410 may be realized by such as a camera device or a display device, but the present invention is not limited thereto.

In an illustrative rather than a restrictive sense, the housing 110 includes a side housing 111 and a bottom housing 112. As indicated in FIG. 1, the bottom housing 112 is formed by multiple sides. The side housing 111 and bottom housing 112 are combined to define the accommodation space 113. The first side 115 and the second side 116 are two opposite sides of the side housing 111. The through hole 114 is disposed on the side housing 111. That is, the cable 200 and the flexible pad 300 both are disposed on the side housing 111.

Figure 6:
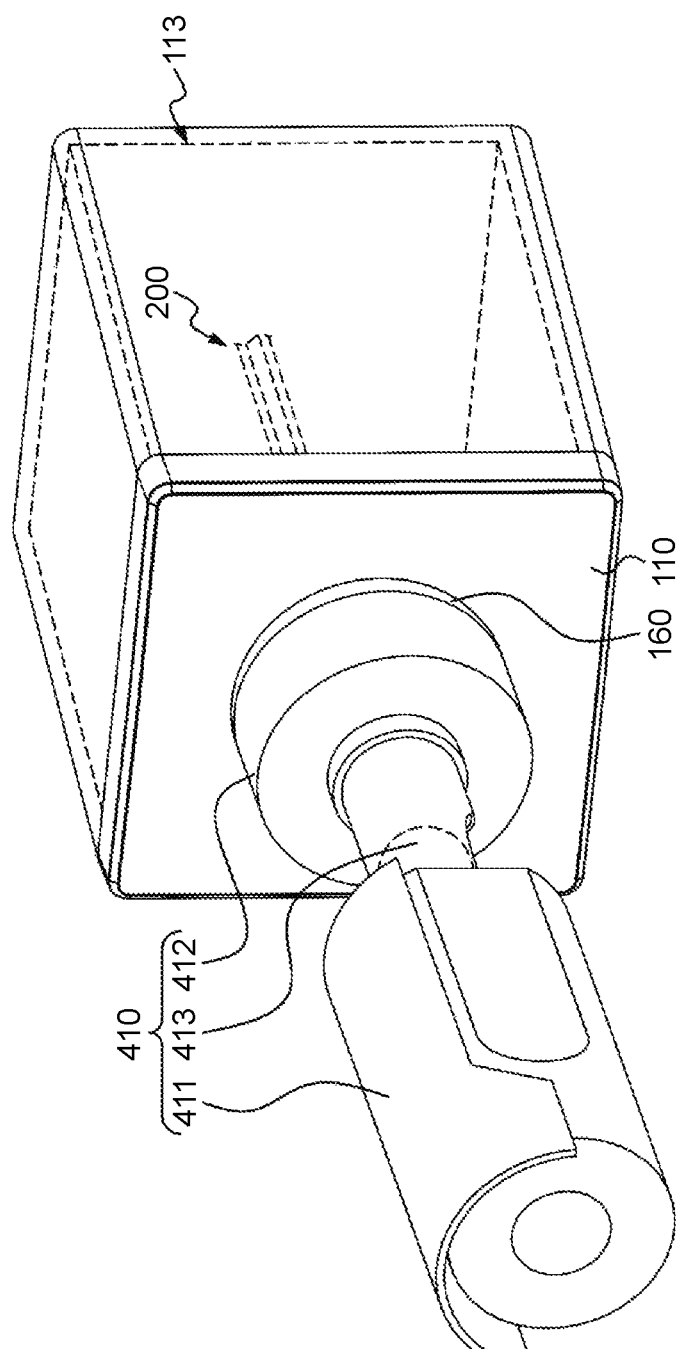
FIG. 6 is a schematic diagram of an electronic system according to an embodiment of the present invention.

FIG. 6 is a schematic diagram of an electronic system 400 according to an embodiment of the present invention. As indicated in FIG. 2 and FIG. 6, the electronic system 400 of FIG. 6 at least includes an electronic device 410 and the said housing 110, the said cable 200 and the said connector 250. In an embodiment, the electronic system 400 further includes the said flexible pad 300. The electronic device 410 is assembled to the linker160 of the housing 110. The cable 200 is electrically coupled to the electronic element disposed in the accommodation space 113 and the electronic device 410 respectively. The cable 200 extends into the electronic device 410 from the housing 110 through the through hole 114 and the recess 161. The electronic device 410 may be realized by such as a camera device or a display device, but the present invention is not limited thereto.

Figure 7:
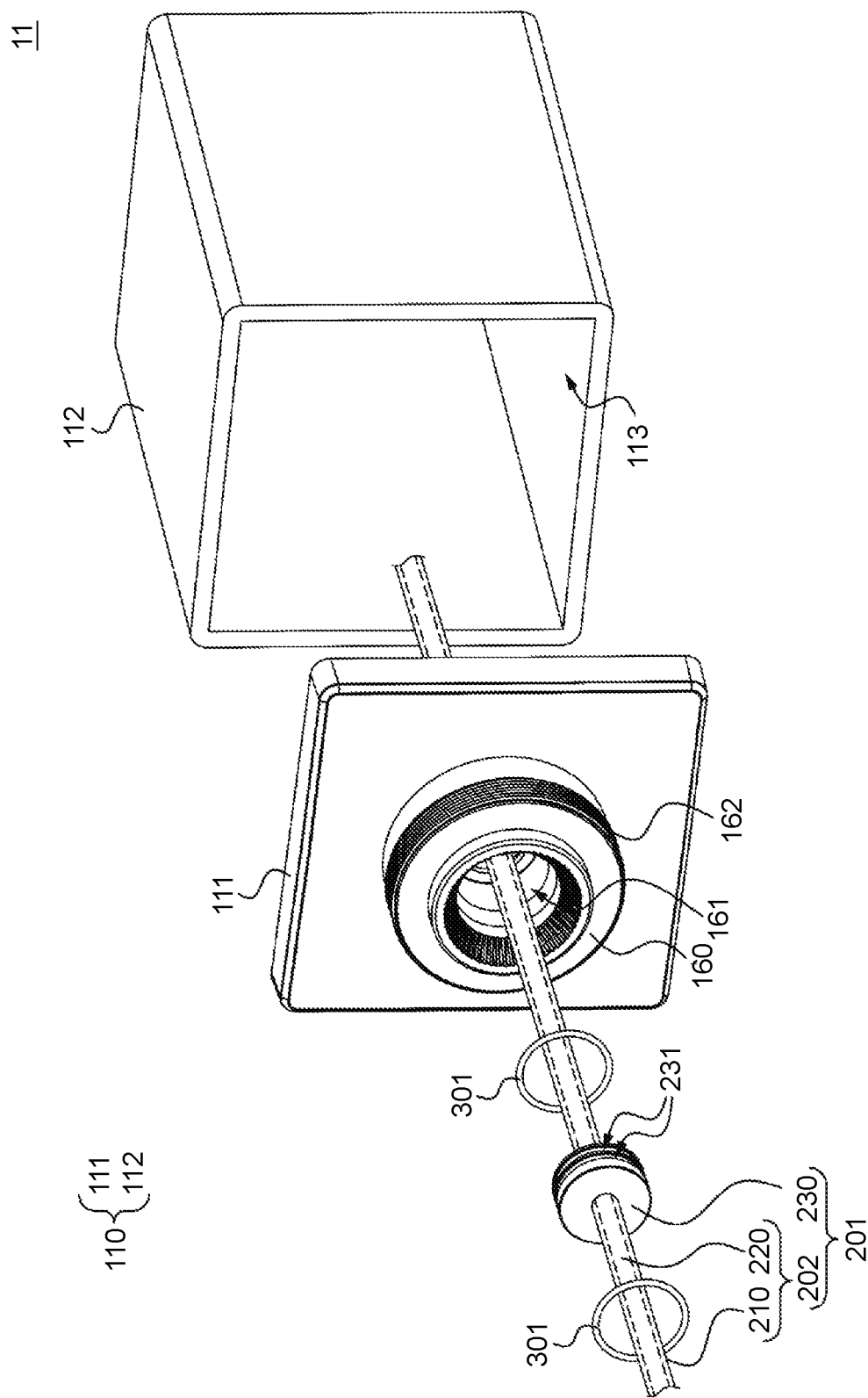
FIG. 7 is an explosion diagram of an outlet structure according to an embodiment of the present invention.
Figure 8:
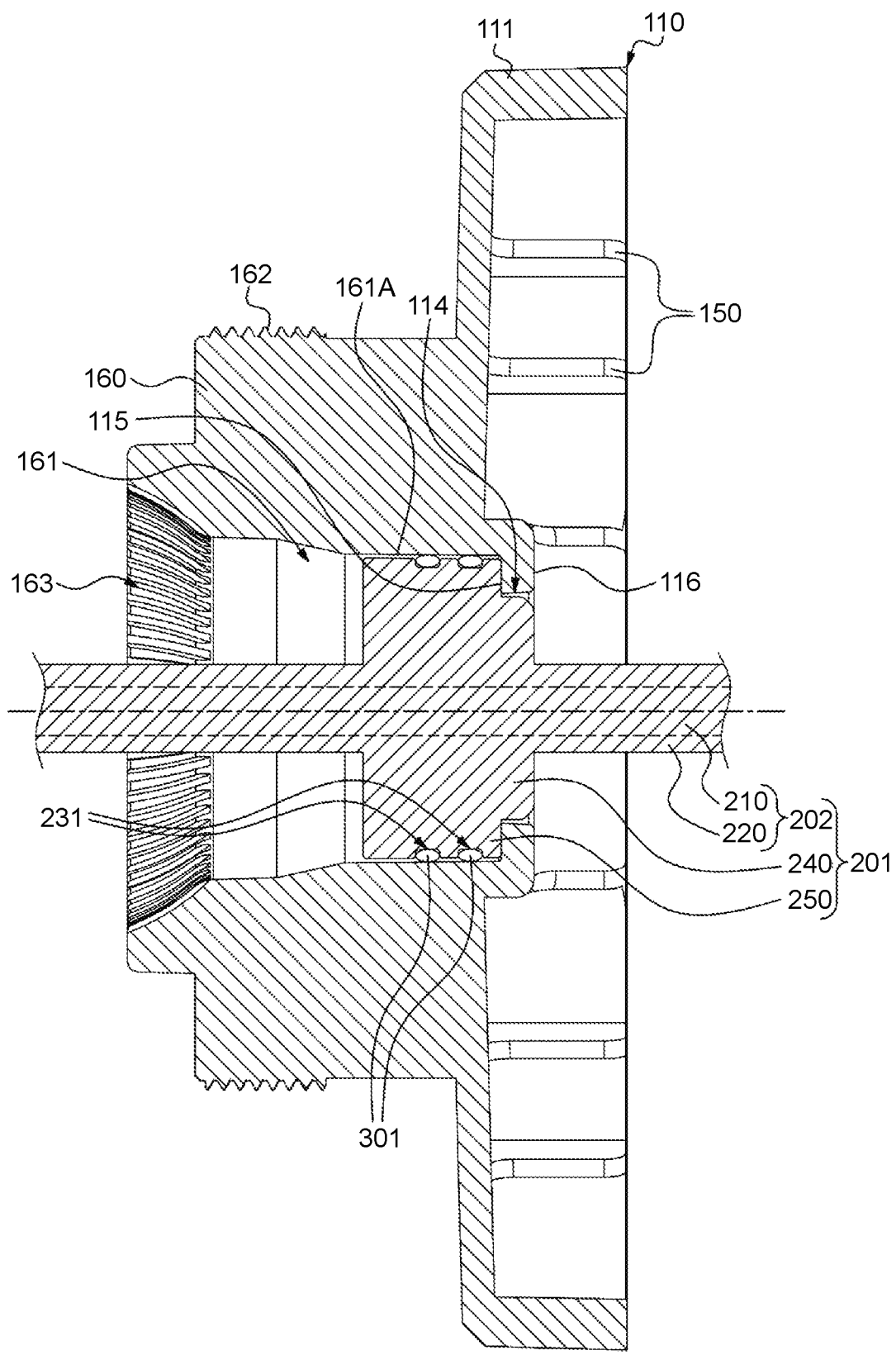
FIG. 8 is a partial cross-sectional view of the outlet structure of FIG. 6 whose section position is the same as that of FIG. 3.

FIG. 7 is an explosion diagram of an outlet structure 11 according to an embodiment of the present invention. FIG. 8 is a partial cross-sectional view of the outlet structure 11 of FIG. 6 whose section position is the same as that of FIG. 3. As indicated in FIG. 7 and FIG. 8, the outlet structure 11 of FIG. 7 and the outlet structure 10 of FIG. 2 are substantially the same except that in the outlet structure 11 of FIG. 7, the annulus 230 of the cable 201 is disposed in the recess 161 and that the connector 301 may be realized by at least one flexible pad. Designations common to FIG. 2 and FIG. 7 are used to indicate identical or similar elements. The flexible pad may be realized by an annular pad formed of a water-proof and elastic material such as rubber, but the present invention is not limited thereto. The connector 301 is directly mounted on the annulus 230 and pressed between the annulus 230 and the side wall of 161A the recess 161. In other words, the annulus 230 of the cable 201 and the connector 301 both are disposed in the recess 161. Besides, the through hole 114 penetrates the first side 115 and the second side 116 of the housing 110.

In the present embodiment, the annulus 230 of the cable 201 is movably disposed in the recess 161 and selectively disposed on the through hole 114. In other words, the annulus 230 may move in a direction towards the through hole 114 or away from the through hole 114. When the annulus 230 is disposed on the through hole 114, the annulus 230 contacts with the first side 115. As indicated in FIG. 8, the diameter of the annulus 230 is greater than the opening of the through hole 114. When the annulus 230 disposed in the recess 161 moves towards the through hole 114, the first side 115 stops the annulus 230 from passing through the through hole 114. When the annulus 230 moves away from the through hole 114 and the annulus 230 does not contact with the first side 115, the annulus 230 does not cover the through hole 114.

In the present embodiment, the cable 201 further has one or more than one groove 231. In an embodiment where the cable 201 has multiple grooves 231, the, the grooves 231 are set on one side of the annulus 230 against the insulation layer 220 at intervals and surround the insulation layer 220. The connecting members 301 are respectively disposed in the groove 231 and are directly mounted on the annulus 230. The connector 301 reduces the likelihood of water or dust entering the housing 110 through the through hole 114.

In the present embodiment, the annulus 230 further has a stopper 240 disposed at a terminal end of the annulus 230. The stopper 240 is annularly disposed on the insulation layer 220 and connected to the annulus 230. Furthermore, the outline of the stopper 240 is substantially the same as that of the through hole 114. When the annulus 230 disposed in the recess 161 covers the through hole 114, the stopper 240 of the annulus 230 is tightly disposed in the through hole 114, hence reducing the likelihood of water or dust entering the housing 110 through the through hole 114.

Figure 9:
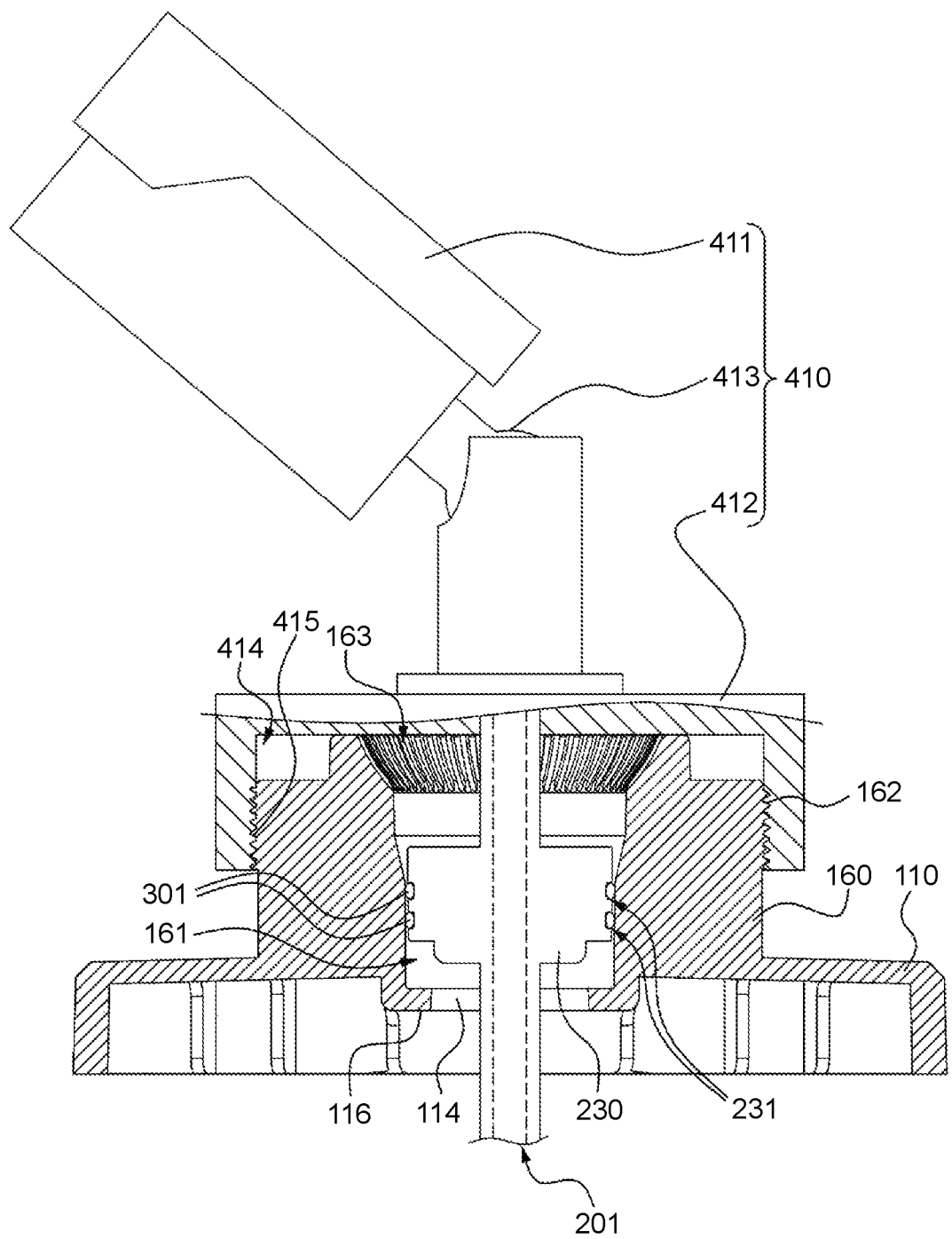
FIG. 9 is an operation diagram of an electronic system according to an embodiment of the present invention.

FIG. 9 is an operation diagram of an electronic system 401 according to an embodiment of the present invention. As indicated in FIG. 7 and FIG. 9, the electronic system 401 of FIG. 9 includes an electronic device 410 and the said housing 110, the said cable 201 and the said connector 301 of FIG. 7 and FIG. 8. The electronic device 410 is assembled to the linker160 of the housing 110. The cable 201 is electrically coupled to the electronic element disposed in the accommodation space 113 and the electronic device 410 respectively. The cable 201 passes through the through hole 114 and the recess 161 and extends to the inside of the electronic device 410 from the housing 110. The electronic device 410 may be realized by a camera device or a display device, but the present invention is not limited thereto.

In the present embodiment, the electronic device 410 includes a device body 411, a pivot portion 413, and a base 412. The device body 411 and the base 412 are pivotally connected though the pivot portion 413, and therefore may rotate with respect to each other. In the present embodiment, one end of the pivot portion 413 is connected to the device body 411, and the other end is pivotally connected to the base 412. In another embodiment, one end of the pivot portion 413 is connected to the base 412, and the other end is pivotally connected to the device body 411. In an alternate embodiment, the two ends of the pivot portion 413 may be pivotally connected to the device body 411 and the base 412 respectively. However, the form of pivotal connection between the device body 411, the base 412, and the pivot portion 413 is not restricted in the present invention.

The base 412 and the linker160 of the housing 110 are assembled to each other, and the base 412 shields the notch 163. The cable 201 passes through the base 412 and is connected to the device body 411 from the inside of the housing 110. To be more specifically, the base 412 has a receiving recess 414 and an internal screw portion 415. The receiving recess 414 is formed on one side of the base 412 opposite to the pivot portion 413, and the internal screw portion 415 is formed on the inner side of the receiving recess 414. With the internal screw portion 415 of the base 412 and the external screw portion 162 of the linker160 being screwed together, the base 412 may be firmly disposed on the linker160. However, the present invention is not limited thereto, and other assembly methods are also within the scope of protection of the present invention.

In an illustrative rather than a restrictive sense, the pivot portion 413 includes a spherical end (not illustrated), and the base 412 includes a spherical groove corresponding to the spherical end. The spherical end of the pivot portion 413 is rotatably disposed in the spherical groove of the base 412. In another embodiment, the pivot portion 413 and the base 412 respectively include at least one shaft and at least one indentation corresponding thereto. The shaft may be rotatably disposed in the indentation.

In the present embodiment, when the device body 411 and the base 412 rotate with respect to each other and pull the cable 201, the annulus 230 moves in the recess 161, and the device body 411 may rotate to a larger angle. Since the base 412 is assembled to the linker160 of the housing 110, even when the cable 201 is over-pulled, the annulus 230 of the cable 201 will not come off the recess 161.

In each embodiment disclosed above, the insulation layer 220 is formed of a water-proof and insulating material such as semi-rigid PVC (SR-PVC). The wire 210 may be realized by a stranded wire. The flexible pad 300 may be formed of a water-proof and elastic material such as rubber, but the present invention is not limited thereto.

The structure disclosed in above embodiments may be formed of tight-fitting members with special specifications, not only reducing overall material cost, but further simplifying assembly difficulty. Moreover, the annulus of the cable effectively stops water or dust entering the housing, and increases the overall water-proof and dust-proof performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wired transmission module comprising:
   a housing having a first side, a second side oppositely, a through hole and a linker, the second side having a receiving slot recessed towards the first side, and the through hole extending to the first side of the housing from the receiving slot;
   a cable comprising a wire and an annulus, the wire passing through the through hole, and the annulus disposed between the wire and the through hole; and
   a connector, the cable disposed on the housing through the annulus and the connector.

2. The wired transmission module according to claim 1, wherein the annulus is disposed in the receiving slot and fixed with the second side of the housing through the connector.

3. The wired transmission module according to claim 1, wherein the annulus has a groove set on one side of the annulus against the wire, and the connector has a notch whose side edge engages with the groove.

4. The wired transmission module according to claim 3, wherein the groove surrounds the wire, and the connector is movably disposed on the second side of the housing.

5. The wired transmission module according to claim 1, wherein the receiving slot has a bottom and an inner surface connecting to the bottom, and the housing further comprises a protrusion contacting with the bottom of the receiving slot.

6. The wired transmission module according to claim 5, wherein the protrusion surrounds the through hole, and a trench surrounding the protrusion is set between the protrusion and the inner surface of the receiving slot.

7. The wired transmission module according to claim 6, further comprising at least one flexible pad disposed in the trench and surrounding the protrusion, wherein the annulus contacts with the protrusion and the flexible pad.

8. The wired transmission module according to claim 1, wherein the housing further comprises at least two limiting bumps and a limiting groove, the limiting bumps are disposed on the second side of the housing, the limiting groove is disposed between the limiting bumps, and the connector is disposed in the limiting groove.

9. The wired transmission module according to claim 1, wherein the housing has a recess, the recess is disposed on the first side of the housing, the through hole penetrates the first side from the recess, the annulus has a groove, the annulus is movably disposed in the recess and selectively disposed on the through hole, and the connector is disposed in the groove of the annulus and interposed between the annulus and a lateral surface of the recess.

10. The wired transmission module according to claim 9, wherein the cable further comprises a stopper disposed on the wire and surrounding the wire, the stopper connects to the annulus, and when the annulus is disposed on the through hole, the stopper is tightly disposed in the through hole.

11. The wired transmission module according to claim 1, further comprising at least one flexible pad, wherein the annulus has a groove, the housing has a recess, and the flexible pad is disposed between the groove, the annulus and an inner surface of the recess.

12. The wired transmission module according to claim 1, wherein the wire has at least one wire and an insulation layer, the insulation layer encloses the wire, and the annulus is disposed on the insulation layer.

13. An electronic system, comprising:
the wired transmission module according to claim 1; and
an electronic device electrically coupled to the cable through the wire.

14. A wired transmission module comprising:
a housing having a first side, a second side, a through hole and a receiving slot, the receiving slot disposed on the second side of the housing, and the through hole extending to the first side of the housing from the receiving slot;
a cable comprising a wire and an annulus, the annulus having a groove, the wire penetrating the through hole, and the annulus coupled to the receiving slot and the through hole of the housing; and
a positioning member engaging with the groove.

15. The wired transmission module according to claim 14, wherein the housing further comprises at least two limiting bumps disposed on the second side of the housing, a limiting groove is set between the limiting bumps, and the positioning member is disposed in the limiting groove.

16. The wired transmission module according to claim 14, wherein the groove is set on one side of the annulus against the wire and surrounds the wire, the positioning member has a notch whose side edge engaging in the groove, and the positioning member is movably fixed on the second side of the housing.

17. The wired transmission module according to claim 14, further comprising at least one flexible pad, wherein the receiving slot has a bottom and an inner surface, the housing further comprises a protrusion projecting from the bottom of the receiving slot, a trench set between the protrusion and the inner surface of the receiving slot, the flexible pad is disposed in the trench, and the annulus contacts with the protrusion and the flexible pad.

18. The wired transmission module according to claim 14, wherein the housing further comprises at least two limiting bumps disposed on the second side of the housing, and a limiting groove set between the at least two limiting bumps.

19. A wired transmission module comprising:
a housing having a through hole and a recess, the through hole extending to one side of the housing opposite to the recess from the recess;
a cable comprising a wire and an annulus, the annulus disposed on the wire, the annulus having at least one groove which is set on one side of the annulus against the wire and surrounds the wire, the wire passing through the through hole, and the annulus movably disposed in the recess and selectively disposed on the through hole; and
at least one flexible pad disposed in the groove and interposed between the annulus and an inner surface of the recess.

* * * * *